(12) United States Patent
Hayes et al.

(10) Patent No.: US 10,793,757 B2
(45) Date of Patent: Oct. 6, 2020

(54) POLYMER COMPOSITIONS AND HOT-MELT ADHESIVES FORMED THEREFROM

(71) Applicants: Henkel IP & Holding GmbH, Duesseldorf (DE); Danimer Bioplastics, Inc., Bainbridge, GA (US)

(72) Inventors: Patrick Hayes, Ringoes, NJ (US); Daniel Carraway, Bainbridge, GA (US); Steven Wann, Bainbridge, GA (US); Rachelle Arnold, Bainbridge, GA (US); Joe B. Grubbs, III, Bainbridge, GA (US)

(73) Assignees: Henkel IP & Holding GmbH, Duesseldorf (DE); Danimer Bioplastics, Inc., Bainbridge, GA (US)

( * ) Notice: Subject to any disclaimer, the term of this patent is extended or adjusted under 35 U.S.C. 154(b) by 129 days.

(21) Appl. No.: 15/776,893

(22) PCT Filed: Nov. 16, 2016

(86) PCT No.: PCT/US2016/062192
§ 371 (c)(1),
(2) Date: May 17, 2018

(87) PCT Pub. No.: WO2017/087465
PCT Pub. Date: May 26, 2017

(65) Prior Publication Data
US 2018/0334599 A1 Nov. 22, 2018

Related U.S. Application Data
(60) Provisional application No. 62/257,318, filed on Nov. 19, 2015.

(51) Int. Cl.
| | | |
|---|---|---|
| C09J 167/04 | (2006.01) | |
| C08L 31/04 | (2006.01) | |
| C08G 63/60 | (2006.01) | |
| C08G 81/00 | (2006.01) | |
| C09J 5/06 | (2006.01) | |

(52) U.S. Cl.
CPC .......... *C09J 167/04* (2013.01); *C08G 63/60* (2013.01); *C08G 81/00* (2013.01); *C09J 5/06* (2013.01); *C08G 2170/20* (2013.01); *C09J 2453/00* (2013.01)

(58) Field of Classification Search
CPC ........ C09J 167/04; C09J 5/06; C09J 2453/00; C09J 2201/61; C08G 63/60; C08G 81/00; C08G 2170/20; C08G 63/00; C08G 63/12
USPC ................ 428/220, 352, 411.1; 252/182.28; 427/516; 435/180
See application file for complete search history.

(56) References Cited

U.S. PATENT DOCUMENTS

| | | | |
|---|---|---|---|
| 5,403,897 A | 4/1995 | Ebato et al. | |
| 5,700,344 A * | 12/1997 | Edgington | C08G 63/08 156/336 |
| 2004/0143072 A1 * | 7/2004 | Lewis | C08G 63/06 525/417 |
| 2007/0243374 A1 | 10/2007 | Lewis et al. | |
| 2008/0234754 A1 | 9/2008 | McCarthy et al. | |
| 2015/0191635 A1 * | 7/2015 | Terfloth | C09J 167/04 156/71 |

OTHER PUBLICATIONS

Polymers: A Property Database. (Poly(Caprolactone), http://poly.chemnetbase.com/faces/chemical/FullScreenEntry.xhtml#4123, p. 1-3, accessed Mar. 30, 2020). (Year: 2020).*
International Preliminary Report on Patentability for PCT/US2016/062192, dated May 22, 2018, 4 pages.
International Search Report and Written Opinion for PCT/US2016/062192, dated May 26, 2018, 5 pages.

* cited by examiner

*Primary Examiner* — Gerard Higgins
*Assistant Examiner* — Kevin C Ortman, Jr.
(74) *Attorney, Agent, or Firm* — Luedeka Neely Group, P.C.

(57) ABSTRACT

Predominately bio-sourced polymer compositions that may be used as hot-melt adhesives are disclosed herein. The polymer compositions may contain a polymer that has the following structure: $G_1$ and $G_2$ are independently $(CH_2)_x$. Variable x is an integer ranging between 1 and 10. Variable y is an integer ranging between about 50 and about 500. Variable z is an integer ranging between about 100 and about 600. Variable n is an integer ranging between about 5 and about 10,000. X is H, a functionalized alkylene polymer block containing alcohol functional groups, or a mixture thereof. Y is H, an acyl group, a functionalized alkylene polymer containing carboxylic acid functional groups, or a mixture thereof.

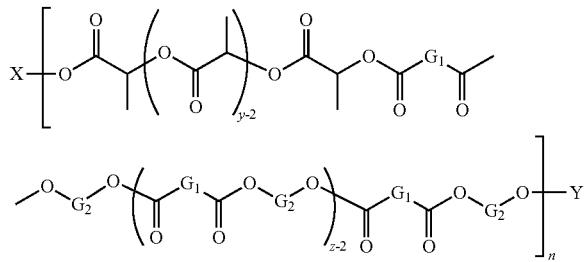

16 Claims, No Drawings

POLYMER COMPOSITIONS AND HOT-MELT ADHESIVES FORMED THEREFROM

This application is a Section 371 national phase entry of PCT application PCT/US2016/062192, filed Nov. 16, 2016. This application also claims the benefit of the earlier filing date of U.S. provisional patent application 62/257,318, filed Nov. 19, 2015.

PARTIES TO A JOINT RESEARCH AGREEMENT

The present disclosure was made under a joint development agreement between DaniMer Scientific, LLC and Henkel Corporation.

BACKGROUND

The present disclosure is directed to predominately bio-sourced polymers, hot-melt adhesives including the predominately bio-sourced polymers, methods for their production and use in end of line packaging. In some embodiments the bio-sourced polymers are biodegradable.

In the packaging industry, many finished products are packed in cardboard boxes or cartons for shipping. "End of line" packaging refers to this process of packing finished products for shipping. In the end of line packaging process one end of the box, generally the bottom, is typically sealed shut with hot melt adhesive or with tape before the box is filled. After the box is filled, the end and side flaps of the open top end of the box are folded inwardly and downwardly. The box then is sealed by applying adhesive to the inside of the mating surfaces of the folded flaps prior to them being folded shut, or by applying tape to the outside of the flaps after they have been folded shut. Hot melt adhesives can be used for box sealing. For this application, solid hot melt adhesive is melted in a melt tank. The Molten adhesive is pumped through a heated hose to a heated nozzle. A molten bead of hot melt is deposited onto the flaps of the package as it passes the nozzle and the nozzle opens to extrude the hot melt. The package's flaps are mechanically closed and then are held shut in a compression section. End of line packaging systems can be highly automated to quickly pack and seal quantities of finished products in boxes before assembling the boxes on pallets for shipping.

Non-curable or conventional hot melt adhesives can be used in end of line packaging. Non-curable or conventional hot melt adhesives are solid at room temperature but, when heated to an elevated temperature, melt to a liquid or fluid state in which form they are applied to a substrate. On cooling, the adhesive composition regains its solid form. The hard phase(s) formed upon cooling the adhesive imparts cohesion (strength, toughness, creep and heat resistance) to the final adhesive. Conventional hot melt adhesives contain no solvent or water. Hot-melt adhesives are also commonly known by the lay term "hot glue."

Curable or reactive hot melt adhesive compositions are also known but are not typically used in end of line packaging. Curable or reactive hot melt adhesive compositions are solid at room temperature and, when heated to an elevated temperature, melt to a liquid or fluid state in which form they are applied to a substrate. On cooling, the adhesive composition regains its solid form. Curable or reactive hot melt adhesive compositions will cure by a chemical crosslinking reaction upon exposure to suitable conditions such as exposure to moisture. Before curing the adhesive composition is thermoplastic and can be remelted and resolidified. Once cured, the adhesive composition is in an irreversible solid form and is no longer thermoplastic. Curable hot melt adhesives contain no solvent or water.

Conventional hot-melt adhesives are comprised of thermoplastic polymers or compositions containing such polymers. Some examples of polymers that are useful in conventional hot-melt adhesives include ethylene-vinyl acetate (EVA) copolymers, ethylene-acrylate copolymers, polyolefins and polyolefin copolymers, polyamides, polyesters, polycarbonates, and styrene block copolymers.

Hot-melt adhesives provide several advantages over solvent-based adhesives for end of line packaging. There is no solvent or water so a drying step is eliminated. Environmental, health and flammability concerns can be much lower for hot-melt adhesives than for solvent containing adhesives. Hot-melt adhesives tend not to lose layer thickness during solidification, unlike solvent-based adhesives.

All hot melt adhesives are not suited for use in end of line packaging systems. Conventional hot melt adhesives typically offer a cost advantage over reactive hot melt adhesives in this application. Some conventional hot melt adhesives have a molten viscosity that is too high for use in end of line packaging equipment. Some conventional hot melt adhesives cool and develop strength too slowly for use in the high speed end of line packaging environment. Some conventional hot melt adhesives are not stable when held in the molten state over long periods of time.

Conventional hot melts are predominantly made with non-renewably sourced raw materials (e.g. petrochemicals). Many end users of these adhesives would prefer that these hot melts be based on bio-sourced materials for reasons of environmental impact and/or long-term security of future supply. To date it has been challenging for adhesive formulators to make a predominantly bio-sourced hot melt adhesive which meets all application and end use performance requirements for end of line packaging.

A disadvantage associated with conventional hot-melt adhesives is their general lack of biodegradability. Both the base polymer forming a hot-melt adhesive composition, as well as various additives that may be added to the base polymer to tailor its dispensation and/or adhesive properties, may limit the biodegradability. The lack of biodegradability of conventional hot-melt adhesives can hamper recycling of paper and cardboard products that have been bonded with such adhesives. At the very least, residual hot-melt adhesives in batch of paper or cardboard can lower the monetary value of these materials, potentially making them less attractive to a consumer entity interested in selling these materials to a recycling facility. At worst, residual hot-melt adhesives in a batch of recycling materials can foul surfaces within a recycling process stream and result in repair costs and process downtime. In fact, the decreased value of recycling streams containing hot-melt adhesives and the potential for equipment damage and downtime can result in the rejection of a material stream that could otherwise be readily recycled.

DETAILED DESCRIPTION

The present disclosure is directed to predominately bio-sourced polymers, hot-melt adhesives including the predominately bio-sourced polymers, methods for their production and use in end of line packaging. In some embodiments, the bio-sourced polymers are biodegradable.

As discussed above, conventional hot melts are not predominantly bio-sourced which may limit their availability in the future' limit customer acceptance and/or have a negative environmental impact. As also discussed above, conventional hot-melt adhesives are not particularly biodegradable, which may negatively impact one's ability to recycle a stream of material that would otherwise be readily recyclable. In addition, many conventional hot-melt adhesives contain further additives that are admixed with the base polymer in order to provide suitable dispensation and/or adhesive bonding properties.

The present inventors discovered new thermoplastic polymers that address the above-discussed issues in the field of hot-melt adhesives. The inventors also discovered facile methods through which the polymers may be synthesized, as discussed further herein.

The polymer compositions described hereinafter can provide a number of advantages over conventional hot-melt adhesives. Foremost, the thermoplastic polymers of the present disclosure are predominately bio-sourced and may be readily biodegradable. As used herein the term "predominately bio-sourced" refers to a substance wherein more than 50%, and preferably more than 60% and more preferably more than 70%, of the substance weight originates from renewable materials. Renewable materials are those derived from raw materials derived from biological sources rather than geological sources. Biological raw materials contain carbon with a carbon-14 isotope content whose relative concentration is approximately equal to the natural abundance of carbon-14 in the atmosphere. As used herein, the term "biodegradable" refers to a substance that can be broken down by exposure to environmental conditions including native or non-native microbes, sunlight, air, heat, and the like. Use of the term "biodegradable" does not imply a particular degree of biodegradability, mechanism or biodegradability, or a specified biodegradation half-life. In addition, the molecular structure of the presently disclosed polymers may be tailored such that they can be applied as a hot-melt adhesive without the use of additional additives to promote dispensation and/or adhesive bonding. However, if needed for a particular polymer or deployment condition, further additives can also be included to form a hot-melt adhesive composition.

Specifically, the present inventors discovered biodegradable thermoplastic block co-polymers containing a lactic acid block and an aliphatic polyester block. The thermoplastic block co-polymers of the present disclosure may be prepared by separately synthesizing or obtaining the lactic acid block and the aliphatic polyester block and then reacting the two blocks with one another to form the copolymer. Optionally, one or both of the polymer's termini may be further functionalized with a functionalized alkylene polymer or a capping group that can further tailor the adhesive and/or dispensation properties of the polymer.

The polymer compositions of the present disclosure may be obtained with a predominant polymer backbone type. Optionally, polymers having related polymer backbone types may be formed during the predominant polymer's synthetic process, and the polymer compositions may therefore comprise an admixture of the predominant polymer and the related polymer backbone types. Any of these polymer compositions may serve as a hot-melt adhesive composition.

In general, thermoplastic polymers of the present disclosure have the molecular structure shown Formula 1 below, wherein A is a lactic acid block, B is an aliphatic polyester block, X is H or a capping group that is reactive with the terminal carboxylic group of the lactic acid block or a carboxylic acid group in B* (if present), Y is H or a capping group that is reactive with the terminal hydroxyl group of the aliphatic polyester block or a hydroxyl group in A* (if present), and n is an integer ranging between about 5 and about 10,000.

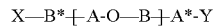

X—B*—[—A-O—B—]—A*-Y         Formula 1

The lactic acid monomers in lactic acid block A are oriented head-to-tail with respect to one another (i.e., through reacting a hydroxyl group of a first lactic acid monomer with a carboxylic acid group of a second lactic acid monomer). Likewise, aliphatic polyester block B contains repeating monomer units of a diol and a diacid that have been esterified with one another. If incompletely esterified diacid is present within aliphatic polyester block when preparing the polymer of Formula 1, the incompletely esterified diacid may react with lactic acid block A and intervene as optional B* between the terminal lactic acid block A and X. Similarly, lactic acid within lactic acid block A may react with incompletely esterified diacid in aliphatic polyester block B and intervene as optional A* between the terminal aliphatic polyester block and Y. Such polymers may also be formed through transesterification, even if incompletely esterified diacid is not present. Accordingly, the polymer compositions of the present disclosure may be obtained as an admixture of related polymers.

It is to be recognized that when A* and/or B* are absent the terminal lactic acid block A is bonded to X and the terminal aliphatic polyester block B is bonded to Y, as depicted in Formula 2. In the particular formula that follow hereinafter, A* and B* are omitted from the structures in the interest of simplicity. However, it is to be recognized that related polymers containing A* and/or B* may be admixed with the particular polymers disclosed hereinafter.

X—[—A-O—B—]$_n$—Y         Formula 2

In more particular embodiments, X can be a functionalized alkylene polymer capping group that reacts with the terminal carboxylic acid group of the lactic acid block A or B* (if present) and Y can be a functionalized alkylene polymer capping group, an acyl group or a mixture thereof that reacts with the terminal hydroxyl group of the aliphatic polyester block B or A* (if present). In some embodiments, at least one of X or Y is not H. In Formula 1, the fraction of lactic acid monomers in lactic acid block A relative to the total number of monomers in the polymer ranges between about 0.1 to about 0.9. In more particular embodiments, the fraction of lactic acid monomers in lactic acid block A relative to the total number of monomers in the polymer ranges between about 0.6 to about 0.8.

In Formulas 1 and 2, the fraction of aliphatic polyester monomers in aliphatic polyester block B relative to the total number of monomers in the polymer ranges between about 0.1 to about 0.9. In more particular embodiments, the fraction of aliphatic polyester monomers in aliphatic polyester block B relative to the total number of monomers in the polymer ranges between about 0.2 to about 0.4.

In more particular embodiments, the fraction of lactic acid monomers in the polymer ranges between about 0.6 and about 0.8 and the fraction of aliphatic polyester monomers in the polymer ranges between about 0.2 and about 0.4.

In Formulas 1 and 2, n is an integer ranging between about 5 and about 10,000. In more particular embodiments, n is an integer ranging between about 20 and about 2,000.

In more specific embodiments, lactic acid block A has the structure shown in Formula 3 below and aliphatic polyester block B has the structure shown in Formula 4 below, such that the thermoplastic polymer has the structure shown in Formula 5 below. Again, it is to be recognized that a polymer composition containing the polymer of Formula 5 may be admixed with related polymer types. Specifically, the polymer of Formula 5 may have B* intervening between X and the terminal lactic acid block A and/or have A* intervening between Y and the terminal aliphatic polyester block B.

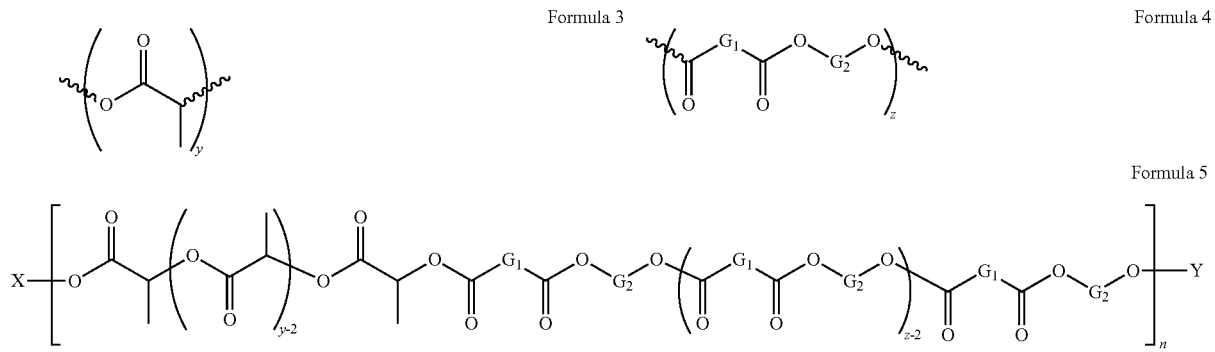

In Formulas 3 and 5 above, y is an integer ranging between about 50 and about 500. In more particular embodiments, y is an integer ranging between about 100 and about 400.

In Formulas 4 and 5 above, z is an integer selected such that the aliphatic polyester block has a molecular weight ranging between about 20,000 and about 100,000. Accordingly, z may range between about 100 and about 600. In more particular embodiments, z may range between about 150 and about 550, or between about 200 and about 400.

In addition, in Formulas 4 and 5 above, $G_1$ and $G_2$ are independently $(CHR)_x$, wherein R is H or an optional branching alkyl group present in at least some of the iterations of $(CHR)_x$ and x is an integer ranging between 1 and about 10. In some embodiments, R is H and G1 and/or G2 are independently $(CH_2)_x$. In more particular embodiments, x is an integer ranging between 2 and about 10. In still more particular embodiments, $G_1$ is $(CH_2)_{x1}$, wherein $x_1$ is an integer ranging between 2 and about 10 or between 2 and about 6, and $G_2$ is $(CH_2)_{x2}$, wherein $x_2$ is an integer ranging between 2 and about 10 or between 2 and about 8. In still more specific embodiments, $x_1$ is 2 or 4 and $x_2$ is 3, 4 or 6.

In some embodiments, the polylactic acid block can contain predominantly a single enantiomer of lactic acid, particularly L-lactic acid. By having a high percentage of L-lactic acid monomers in the polymers described herein, the hardening properties of the polymers can be improved upon cooling of the melted polymers. In some embodiments, the polylactic acid block can be formed solely from L-lactic acid. In other various embodiments, the fraction of L-lactic acid in the polylactic acid block can range between about 0.7 and about 1, with the remaining fraction of lactic acid monomers in the polylactic acid block being comprised of D-lactic acid.

In other various embodiments, the polylactic acid block can contain a mixture of L-lactic acid and D-lactic acid. In various embodiments, the ratio of L-lactic acid to D-lactic acid can range between about 0.01 to about 1.0, more typically in the range of about 0.3 to about 0.7, or in the range of about 0.5 to about 0.7. In some embodiments, the polylactic acid block may contain a racemic mixture of L-lactic acid and D-lactic acid.

In some embodiments, the polylactic acid block may contain a first sub-block comprising a single lactic acid enantiomer (e.g., L-lactic acid) and a second sub-block comprising a mixture of lactic acid enantiomers. The sub-blocks may be synthesized separately and reacted to form the lactic acid block, as discussed in more detail below.

In Formulas 1, 2 and 5 above, X and Y may both be H, in some embodiments. In some embodiments, one of X or Y may be H and the other of X or Y may be a functionalized alkylene polymer. In still other embodiments, neither X nor Y is H. More specific definitions of X and Y follow below.

In more specific embodiments, X is independently H or a first functionalized alkylene polymer block. The first functionalized alkylene polymer block may contain an alcohol functional group capable of undergoing esterification with a carboxylic acid group (i.e., from lactic acid block A or from B*). In other embodiments, X is an alkanol having about 2 to about 20 carbon atoms, whose alcohol group may cap lactic acid block A or B* in a similar manner. In still other embodiments, hydroxylated copolymers of acrylates and methacrylates may be used as X.

In more specific embodiments, X is independently H or a first functionalized alkylene polymer block, and Y is independently H, an acyl group or a second functionalized alkylene polymer block. Similarly, in other more specific embodiments, Y is independently H, an acyl group or a second functionalized alkylene polymer block. The second functionalized alkylene polymer block may contain a carboxylic acid functional group capable of undergoing esterification with a hydroxyl group (i.e., from aliphatic polyester block B or from A*).

In a preferred embodiment, Y may be an acyl group, which may be formed by reaction of the block copolymer with an appropriate acid anhydride to form the terminal or capping acyl group. Without being bound by theory, it is believed that when Y is an acyl group, the final copolymer exhibits improvments in viscosity stability when heated for an extended period of time. When Y is an acyl group, it may contain about 2 to about 20 carbon atoms. In a particularly preferred embodiment, Y may be a propionyl group, which may be formed by reaction of the block copolymer with propionic anhydride.

When present, the first functionalized alkylene polymer block can be a functionalized alkylene polymer containing alcohol functional groups. Such functionalized alkylene polymer blocks may be homopolymers or copolymers containing alcohol functional groups that can undergo esterification with the terminal carboxylic acid moiety in Formula 4 above. In more specific embodiments, the first functionalized alkylene polymer block can be an alkylene polymer selected from a copolymer of ethylene and vinyl alcohol, a copolymer of ethylene, vinyl acetate and vinyl alcohol, or poly(vinyl alcohol). Up to 20 mol. % alcohol groups may be present in the first functionalized alkylene polymer block. In some embodiments, the first functionalized alkylene polymer block may comprise an alkylene polymer having a molecular weight of about 1,000 or above. The first functionalized alkylene polymer block may comprise an alkylene polymer that is linear in some embodiments or branched in other embodiments.

When Y is not H, it may be an acyl group or a second functionalized alkylene polymer block. Acyl groups, when present, can have the general formula —(C=O)R$_1$, wherein R$_1$ is a straight-chain or branched alkyl group having from 1 to 18 carbon atoms. In more particular embodiments, R$_1$ is a straight-chain alkyl group having 1 to 3 carbon atoms, more specifically 1 or 2 carbon atoms when Y is acetate or propionate. When Y is a second functionalized alkylene polymer block, it can be a functionalized alkylene polymer containing carboxylic acid functional groups. Such functionalized alkylene polymer blocks may be homopolymers or copolymers containing alcohol functional groups that can undergo esterification with an alcohol moiety. In more specific embodiments, the second functionalized alkylene polymer block can be a copolymer of vinyl acetate and crotonic acid. A suitable copolymer of vinyl acetate and crotonic acid that may be used in this regard is VINNAPAS C305, available from Wacker Chemie. In some embodiments, the second functionalized alkylene polymer block may comprise an alkylene polymer having a molecular weight of about 1,000 or above. The second functionalized alkylene polymer block may comprise an alkylene polymer that is linear in some embodiments or branched in other embodiments.

In one specific embodiment, polymers of the present disclosure may be obtained with a terminal lactic acid carboxylic group within the lactic acid block unfunctionalized as H and a terminal hydroxyl group within the aliphatic polyester block functionalized as a mixture of vinyl acetate-crotonic acid alkylene copolymer and propionate derivatives. In other specific embodiments, the terminal hydroxyl group may be functionalized with the vinyl acetate-crotonic acid alkylene copolymer without the propionate group being present. In still other specific embodiments, the terminal hydroxyl group may be functionalized with the propionate group or another acyl group without the vinyl acetate-crotonic acid alkylene copolymer being present.

Methods for synthesizing the polymers of the present disclosure are also described herein. Upon undergoing synthesis as described herein, the hot-melt adhesive may be obtained from the reactor or further processed into a suitable form such as blocks, pellets, sticks or pastilles.

In general, methods for synthesizing the polymers of the present disclosure comprise combining the polylactic acid block and the aliphatic polyester block in an appropriate ratio and heating to affect esterification of these two polymer blocks with one another. In some embodiments, the polymer of Formula 45 may be formed under such conditions. When X or Y is not H, an appropriate functionalizing species may be pre-reacted with at least a portion of lactic acid block A or aliphatic polyester block B before reacting the polymer blocks together with one another. For example, pre-reacted lactic acid block A and aliphatic polyester block B may have the formulas shown below in Formulas 6 and 7, respectively, where x, y, X and Y are otherwise defined as above.

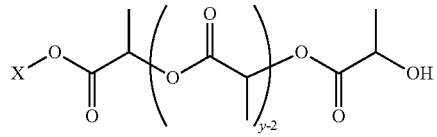

Formula 6

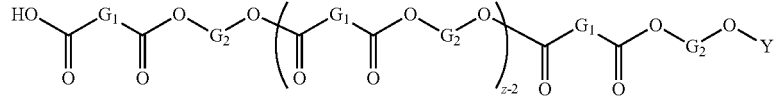

Formula 7

In other various embodiments, methods for forming the polymer of Formula 4 can include combining lactic acid block A and aliphatic polyester block B without pre-reacting these blocks and further combining a species that reacts either at the head or tail of the polymer to introduce X or Y into the polymer.

In additional embodiments, methods described herein may further comprise synthesizing or obtaining lactic acid block A. Methods for synthesizing lactic acid block A may include ring-opening polymerization of lactide, direct esterification of lactic acid, or a combination thereof. Such methods will be familiar to one having ordinary skill in the art. Ring-opening polymerization of lactide may be used to provide substantially a single lactic acid enantiomer in lactic acid block A. Direct esterification may provide a mixture of lactic acid enantiomers. Mixtures of polylactic acid produced by ring-opening polymerization and produced by direct esterification may be combined and reacted to form lactic acid block A in the embodiments of the present disclosure. Reacting a mixture of polylactic acid produced by these different synthesis techniques may be used to adjust relative ratio of lactic acid enantiomers in lactic acid block A.

In additional embodiments, methods described herein may further comprise synthesizing or obtaining aliphatic polyester block B. Methods for synthesizing aliphatic polyester block B may include direct esterification of a diol and a dicarboxylic acid or reactive dicarboxylic acid derivative (e.g., a diacid chloride, diacid anhydride, or a diacid cyclic anhydride). Such methods will be familiar to one having ordinary skill in the art. For example, in some embodiments, succinic acid or adipic acid may be reacted with 1,4-butanediol to provide the aliphatic polyester block. In addition to single dicarboxylic acids and single diols, mixtures of suitable dicarboxylic acids and diols may be reacted to form the aliphatic polyester block.

The thermoplastic polymers described hereinabove are useful in conventional hot-melt adhesive compositions. Advantageously, the thermoplastic polymers described hereinabove may be formulated as hot-melt adhesive compositions without further additives. That is, hot-melt adhesive compositions of the present disclosure may consist of or consist essentially of the above thermoplastic polymers. The ability to formulate hot-melt adhesive compositions without additional additives can facilitate the biodegradation of these materials.

In alternative embodiments, however, additional additives can be present to further modify the dispensation, formulation and/or adhesive bonding properties of the hot-melt adhesive compositions. Suitable additives will be familiar to one having ordinary skill in the art and can include, for example, any or all of thermoplastic oligomer, thermoplastic polymer or thermoplastic copolymer, tackifier, plasticizer, wax, antioxidant, UV stabilizer, pigment, dye, biocide, flame retardant, antistatic agent, particulate filler materials and the like. Some of these additives may be desirable for tailoring the hot-melt adhesives for a particular application, as well as for promoting long-term stability when deployed. In some embodiments, additives, when present, may be derived from natural sources and may themselves be biodegradable.

The total level of additives will vary depending on the amount of each particular additive needed to provide the conventional reactive hot melt adhesive composition with desired properties. The level of additives can be from 0% to 50% and more preferably 0% to 30%.

Waxes are described in Ullmann's Encyclopedia of Industrial Chemistry, the contents of which are incorporated by reference herein. Examples of waxes that may be used include natural waxes, partially synthetic waxes and fully synthetic waxes. Natural waxes are formed through biochemical processes and are products of animal or plant metabolism. Partially synthetic waxes are formed by chemically reacting natural waxes. Fully synthetic waxes are prepared by polymerizing low molar mass starting materials such as carbon, methane, ethane or propane. The two main groups of fully synthetic waxes are the Fischer-Tropsch waxes and polyolefin waxes such as polyethylene wax, polypropylene wax and copolymers thereof.

Tackifiers include natural and modified rosin, aromatic tackifier or mixtures thereof. Natural and modified rosins include gum rosin, wood rosin, tall oil rosin, distilled rosin, hydrogenated rosin, dimerized rosin, resinates, and polymerized rosin; glycerol and pentaerythritol esters of natural and modified rosins, including, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin. Examples of commercially available rosins and rosin derivatives that could be used to practice the invention include Sylvalite RE 110L, Sylvares RE 115, and Sylvares RE 104 available from Arizona Chemical, Dertocal 140 from DRT, Limed Rosin No. 1, GB-120, Pencel C from Arakawa Chemical, rosin ester such as KE-100 available from Arakawa Chemical Co., rosin ester such as Komotac 2110 from Komo Resins. Aromatic tackifiers include styrenic monomers, styrene, alpha-methyl styrene, vinyl toluene, methoxy styrene, tertiary butyl styrene, chiorostyrene, coumarone, indene monomers including indene, and methyl indene, aromatic hydrocarbon resins that are phenolic-modified aromatic resins, $C_9$ hydrocarbon resins, aliphatic-modified aromatic $C_9$ hydrocarbon resins, $C_9$ aromatic/aliphatic olefin-derived and available from Sartomer and Cray Valley under the trade name Norsolene and from Rutgers series of TK aromatic hydrocarbon resins. Other aromatic tackifiers are alpha-methyl styrene types such as Kristalex 3100, Kristalex 5140 or Hercolite 240, all available from Eastman Chemical Co. Other useful tackifier choices include natural and petroleum-derived materials and combinations thereof as described in C. W. Paul, "Hot Melt Adhesives," in Adhesion Science and Engineering-2, Surfaces, Chemistry and Applications, M. Chaudhury and A. V. Pocius eds., Elsevier, New York, 2002, p. 718, incorporated by reference herein.

In some embodiments, the hot-melt adhesives of the present disclosure may be biodegradable under pulping conditions used in paper and cardboard recycling. Under such conditions, the polymers of the present disclosure may undergo hydrolysis of at least a portion of their ester bonds to degrade the polymer chain.

One application of the disclosed conventional hot melt adhesive is end of line packaging. The adhesive desirably has a molten viscosity low enough to allow pumping and application of a desired amount of molten adhesive in a short time. The viscosity of the molten adhesive is important as most application systems use air pressurized piston pumps. Adjustment of the air pressure permits the operator to control the volume of hot melt being applied to the package. If the viscosity of the adhesive is too high, very high air pressures will be required to pump the adhesive and it will be difficult to control the bead pattern (e.g. a non-uniform bead or tendency to string, as a result of poor cutoff of the bead coming out of the nozzle). The adhesive desirably maintains this viscosity over the long periods of time it is in the molten state.

The adhesive desirably maintains this viscosity over the long periods of time it is in the molten state. A thermally stable adhesive is important. If viscosity changes with heat exposure in the application tank then the equipment operators will frequently need to adjust application settings to ensure consistent beads. If gels or char are formed after extended heating then in-line filters or application nozzles can become clogged, resulting in downtime and costly parts replacements. If the product separates into different phases after extended heating then perhaps only one phase will be pumped out of the glue tank leading to unacceptable performance.

In one embodiment, the hot melt adhesive may have a viscosity from about 800 to about 3000 cPs when measured at a temperature of about 290° F. In another embodiment, the hot melt adhesive may have a viscosity from about 4000 to about 5000 cPs when measured at a temperature of about 290° F. In some embodiments, the adhesive exhibits a viscosity drop of less than about 50% (and more preferably less than about 10%) after storage for 24 hours at a temperature of 290° F. In other instances, adhesive may exhibit a viscosity drop from about 10% to about 30% after storage for 24 hours at a temperature of 290° F.

The open time of the adhesive is defined as the length of time one has available to mate the unglued package flap to the flap with the applied hot melt bead, so that a bond of good integrity results. The applied hot melt must be able to wet out and penetrate the unglued flap to make a good bond. The adhesive needs to have a sufficient inherent open time to accommodate application equipment with various mating times (slower line speeds will cause slower mating times).

The set time of the adhesive is defined as the length of time required to hold the package flap bonds in place under compression so that a bond of good integrity results. If the adhesive' set time is short enough then as the package comes out of compression, the flaps will not pop open. Ideally, a destructive "fiber-tearing" bond will result if the flaps are pulled apart at this point. A fast setting glue is advantageous for those customers that run fast packaging lines where compression time is short. The applied adhesive in the molten or partially solidified state desirably has sufficient cohesive strength to hold the flaps together until the adhesive is fully solidified. The applied adhesive can desirably solidify quickly enough from the molten state to allow bonding of the flaps in a short time.

Once the package has been sealed, various factors will determine if the bond remains intact during its service life. Good adhesion to the paper stocks of the package is important across a wide range of environmental conditions. Bonds must remain intact under low and high temperatures and must not weaken when exposed to high humidity.

Package flaps will be under natural spring forces once sealed. The adhesive bonds must have good heat resistance be able to withstand these forces and prevent pop opens, especially under high storage or transport temperatures.

The hot melt adhesive can be prepared from renewable materials allowing the adhesive to biodegrade much more quickly than a hot melt adhesive prepared from synthetic polyolefin polymers.

In one embodiment a biodegradable hot melt adhesive for end-of-line packaging has the following properties:

Open time: minimum 5 seconds on Kanebo tester (ASM-15N Hot-Melt Tester available from MEC Co., Ltd., Shin-senba Building 303, 1-15-8 Senbahigashi Mino city, Osaka, 562-0035, Japan.

Set time: maximum 5 seconds on Kanebo tester.

Viscosity at application temperature, typically 290° F.: 800-3000 cPs; preferably 800-2200 cPs; more preferably 800-1300 cPs. Heat stability: <10% drop in viscosity after storage for 24 hours at 290° F.

Stable set speed even after exposure to high humidity or extended heating.

Adhesion to corrugated cardboard over a temperature range of 0-130 F.

Viscosity was tested using a Brookfield Thermosel viscometer RVDV1+. Sample was melted at 290° F.

Open and Set Time were tested on a Kanebo tester using a 0.1" wide bead applied at 290° F.

Heat stability was tested by holding 100 g of sample in a foil covered, 8 ounce glass jar in a 290° F. oven. Viscosity was monitored over time and observations were made concerning visual condition of the sample.

High bond heat resistance was tested by placing machine sealed boxes in an oven, held constant at 125 F for 24 hours. The number of boxes that popped open was monitored. Preferably, no boxes open.

Adhesion—hand made corrugate bonds were tested for bond strength and level of fiber tear after 24 exposure to various temperature conditions. Bond strength is qualitatively evaluated by the tester. Fiber tear is preferably a minimum of 75%. Fiber tear was calculated as the amount of fiber left on the surface of the adhesive, which indicates failure within the substrate and not at the interface between the adhesive and the substrate. Three specimens were tested to obtain the average percent fiber tear.

To facilitate a better understanding of the embodiments of the present disclosure, the following examples of preferred or representative embodiments are given. In no way should the following examples be read to limit, or to define, the scope of the disclosure.

Examples

Precursor Formation: Lactic acid block 1. A 2.5 L reactor equipped with a condenser was charged with lactic acid (2431.8 g) and was heated to 165° C. for 2 h. The pressure was reduced to 3 mbar over 2 hours, and water was collected in the receiver. The reaction was continued at 165° C. and 3 mbar pressure for 22 h. The product was collected as a light brown glassy solid. Lactic acid block 2. A 2 L flask equipped with a mechanical stirrer and nitrogen inlet was charged with lactide (NatureWorks) (1280 g), 1-hexanol (7.7 g), and tin (II) butoxide (0.7 g). The vessel was heated to 145° C. for 8 h and the product was collected as a glassy, light brown solid. Aliphatic polyester block. A 20 L reactor equipped with a mechanical stirrer and condenser was charged with 1,4-butanediol (9.56 kg), succinic acid (10.02 kg), and adipic acid (3.10 kg). The mixture was heated under nitrogen for five hours at 180° C. Vacuum was then applied to remove the bulk of the evolved water. Zirconium n-butoxide (42.48 g) was then added through a sample port on the reactor, and the mixture was heated at 215° C. under vacuum for 12 h. The product was isolated by emptying the contents of the reactor to a tray and allowing it to cool.

Preparation of hot melt adhesive composition 1: A 2 L reactor equipped with a mechanical stirrer was charged with lactic acid block 1 (109 g), lactic acid block 2 (424 g), aliphatic polyester block (195 g), and vinyl acetate-crotonic acid copolymer (Wacker VINNIPAS C305, 22.5 g). The mixture was heated to 145° C. under vacuum (60 mbar) until the mixture was melted and mixed. Propionic anhydride (23.2 g) was then added and the mixture was heated with stirring under nitrogen for 3 h. The pressure was reduced to 4 mbar and heating was continued for 1 h Analysis and testing of hot melt adhesive composition 1. The hot melt adhesive had a viscosity of 2900 cPs at 290° F. and a heat stability of 8% drop in viscosity after 24 hours at 290° F. No charring, gelling or severe discoloration was noted after heat stability testing. The adhesive had an open time of 10 seconds and a set time of 5 seconds. Adhesion testing of corrugated samples made using this hot melt adhesive had more than 75% fiber tear over a range of temperatures from 0 to 130° F. Boxes sealed with this adhesive did not pop open when held at 125° F. for 24 hours. Hot melt adhesive composition 2 is suited for use as an end-of-line adhesive.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A polymer composition comprising:
a polymer comprising a lactic acid block and an aliphatic polyester block, the polymer having a structure of:

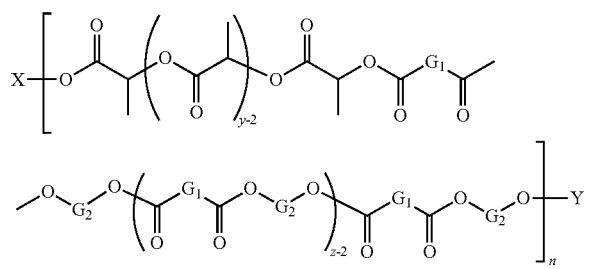

wherein $G_1$ and $G_2$ are independently $(CH_R)_x$, R is an alkyl group or H, and x is an integer ranging between 1 and 10;
wherein y is an integer ranging between 50 and 500;
wherein z is an integer ranging between 100 and 600;
wherein n is an integer ranging between 5 and 10,000;
wherein X is H, a functionalized alkylene polymer block containing alcohol functional groups, or a mixture thereof; and
wherein Y is H, an acyl group, a functionalized alkylene polymer containing carboxylic acid functional groups, or a mixture thereof.

2. The polymer composition of claim 1, wherein the lactic acid block contains L-lactic acid.

3. A method comprising:
combining a lactic acid block and an aliphatic polyester block, the lactic acid block having a structure of

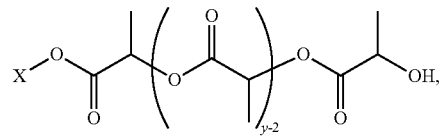

and the aliphatic polyester block having a structure of

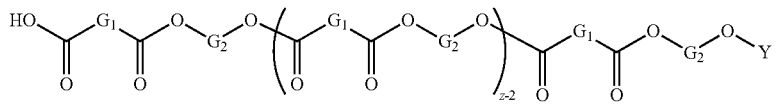

and
reacting the lactic acid block and the aliphatic polyester block to form the polymer of claim 1;
wherein $G_1$ and $G_2$ are independently $(CH_R)_x$, R is an alkyl group or H, and x is an integer ranging between 1 and 10;
wherein y is an integer ranging between about 50 and 500;
wherein z is an integer ranging between about 100 and 600;
wherein X is H, a functionalized alkylene polymer block containing alcohol functional groups, or a mixture thereof; and
wherein Y is H, an acyl group, a functionalized alkylene polymer containing carboxylic acid functional groups, or a mixture thereof.

4. A hot melt adhesive including:
a polymer comprising a lactic acid block and an aliphatic polyester block, the polymer having a structure of:

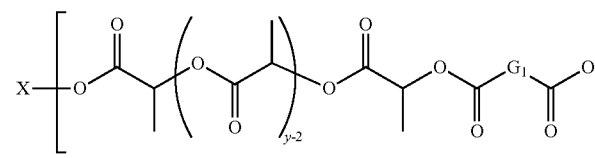

wherein $G_1$ and $G_2$ are independently $(CH_R)_x$, R is an alkyl group or H, and x is an integer ranging between 1 and 10;
wherein y is an integer ranging between 50 and 500;
wherein z is an integer ranging between 100 and 600;
wherein n is an integer ranging between 5 and 10,000;
wherein X is H, a functionalized alkylene polymer block containing alcohol functional groups, or a mixture thereof; and
wherein Y is H, an acyl group, a functionalized alkylene polymer containing carboxylic acid functional groups, or a mixture thereof.

5. The hot melt adhesive of claim 4, wherein the lactic acid block contains L-lactic acid.

6. The hot-melt adhesive of claim 4 consisting of the polymer and optionally one or more additives.

7. The hot melt adhesive of claim 4 having a viscosity of 800 to 3000 cPs at 290° F.

8. The hot melt adhesive of claim 4 having less than 10% drop in viscosity after storage for 24 hours at 290° F.

9. The hot melt adhesive of claim 4 having an open time of 5 seconds or more.

10. A package comprising two substrates bonded together by the hot melt adhesive of claim 4.

11. The hot melt adhesive of claim 4 having a viscosity of 4000 to 5000 cPs at 290° F.

12. The hot melt adhesive of claim 4 having a drop in viscosity after storage for 24 hours at 290° F. from about 10% to about 30%.

13. The polymer composition of claim 1, wherein Y is an acyl group having from 2 to 20 carbon atoms.

14. The polymer composition of claim 1, wherein Y is a propionyl group.

15. The hot melt adhesive of claim 4, wherein Y is an acyl group having from 2 to 20 carbon atoms.

16. The hot melt adhesive of claim 4, wherein Y is a propionyl group.

* * * * *